United States Patent [19]
Donovan et al.

[11] 3,950,254

[45] *Apr. 13, 1976

[54] SOLIDS CONCENTRATOR WITH A ROTOR HAVING PLOUGHS THEREON

[75] Inventors: James Donovan, Cambridge; Alex Bagdasarian, Arlington, both of Mass.

[73] Assignee: Artisan Industries Inc., Waltham, Mass.

[ * ] Notice: The portion of the term of this patent subsequent to May 20, 1992, has been disclaimed.

[22] Filed: Jan. 16, 1975

[21] Appl. No.: 541,390

Related U.S. Application Data

[62] Division of Ser. No. 469,627, May 13, 1974, Pat. No. 3,884,813.

[52] U.S. Cl. .................................. 210/297; 210/332
[51] Int. Cl.² ........................................... B01D 33/00
[58] Field of Search ........... 210/247, 297, 298, 331, 210/332, 380, 456

[56]  References Cited
UNITED STATES PATENTS

| | | | |
|---|---|---|---|
| 3,029,951 | 4/1962 | Cannon | 210/298 |
| 3,395,801 | 8/1968 | Muller | 210/331 X |
| 3,437,208 | 4/1969 | Kaspar et al. | 210/297 |
| 3,591,009 | 7/1971 | Luthi | 210/331 X |
| 3,884,805 | 5/1975 | Donovan et al. | 210/297 |
| 3,884,813 | 5/1975 | Donovan et al. | 210/332 X |

*Primary Examiner*—Theodore A. Granger
*Attorney, Agent, or Firm*—Richard L. Cannaday; William J. Ungvarsky; Robert T. Tobin

[57] ABSTRACT

The concentrator has at least one shaft-mounted rotor disc of solid or hollow construction with two or more ploughs located equally spaced about its periphery. The ploughs extend outwardly into the flow path of a solids-containing fluid within the concentrator to deter any tendency, due to centrifugal force, for a build-up of solids between stationary filter means and in a region remote from the periphery of the rotor disc. In a disclosed embodiment of the concentrator, the shaft-mounted rotor disc has at least one passage therethrough for the flow of solids-containing fluid from one side of the rotor disc to the other, and a plough is provided adjacent the passage and on a hub of the rotor disc to deter any tendency for a build-up of solids adjacent the passage. Further, in a disclosed concentrator with stationary filter means of annular construction wherein the inner edge of the annular filter means is spaced from a rotor shaft or hub thereon, a plough extending toward the rotor shaft is provided on the inner edge of the filter means.

2 Claims, 9 Drawing Figures

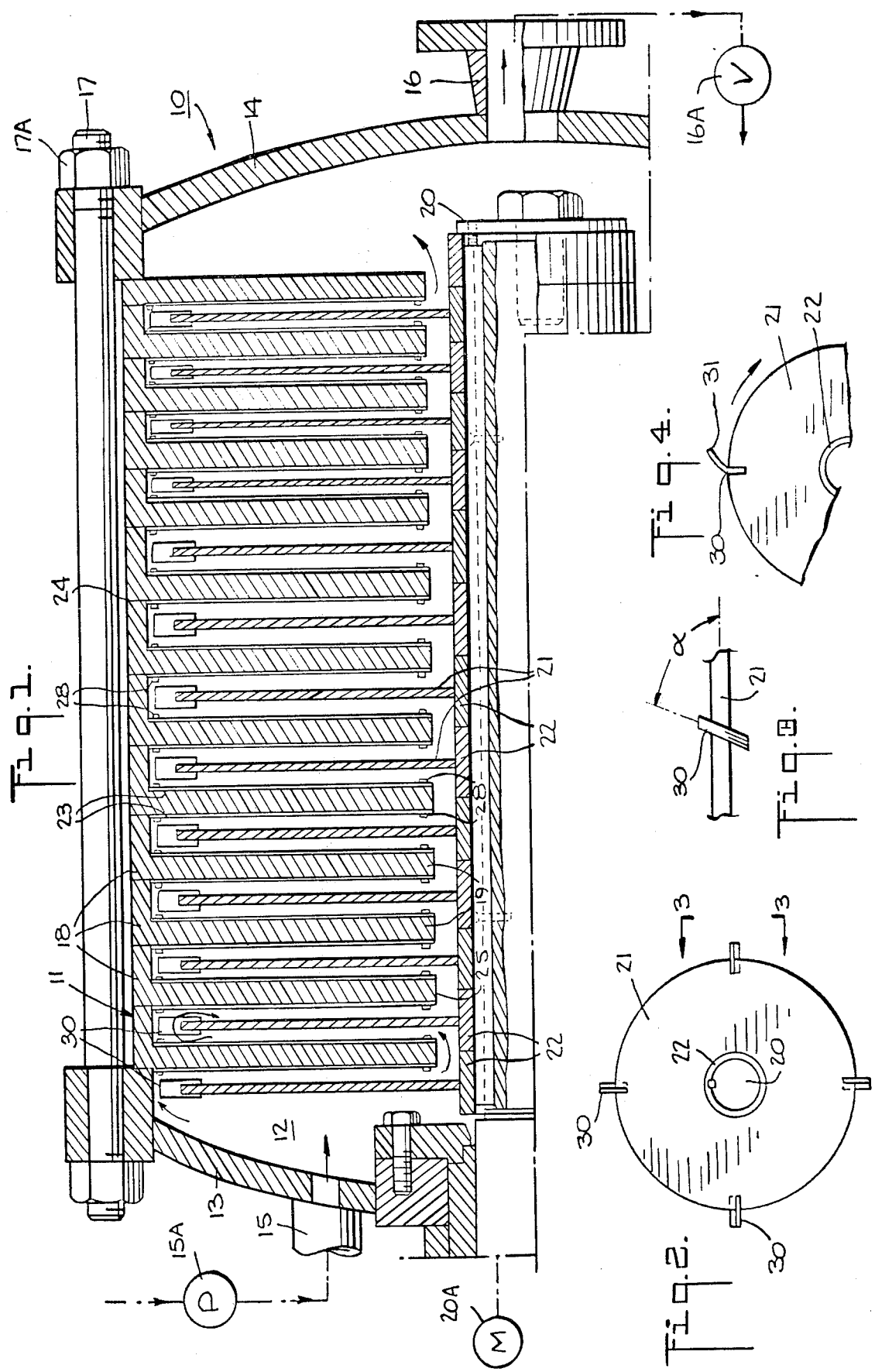

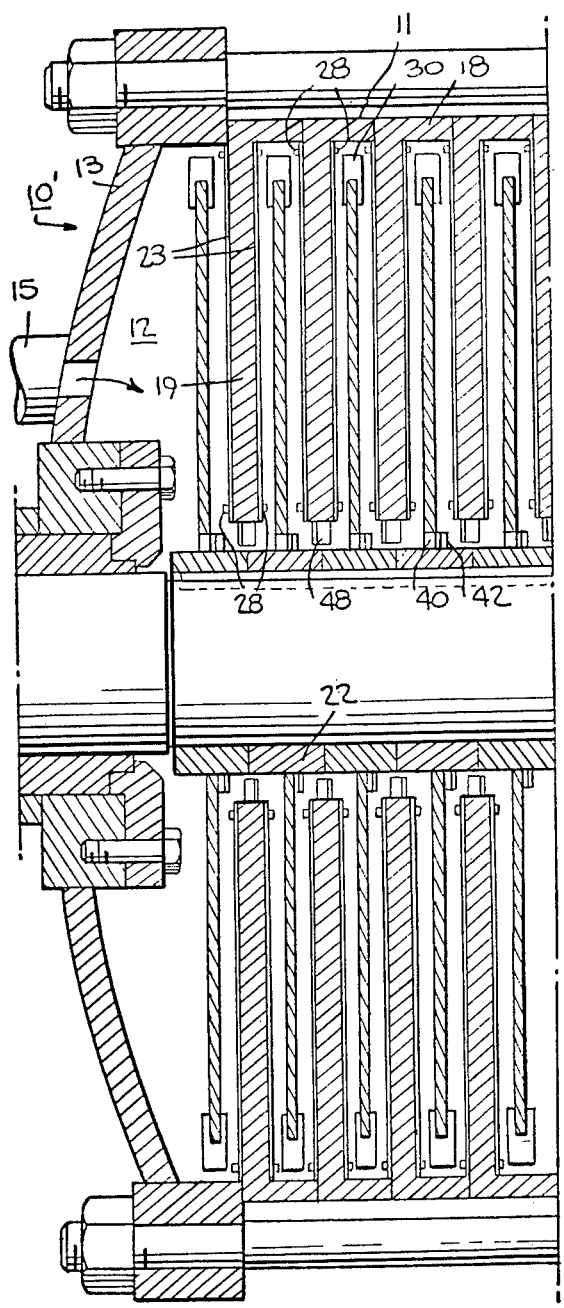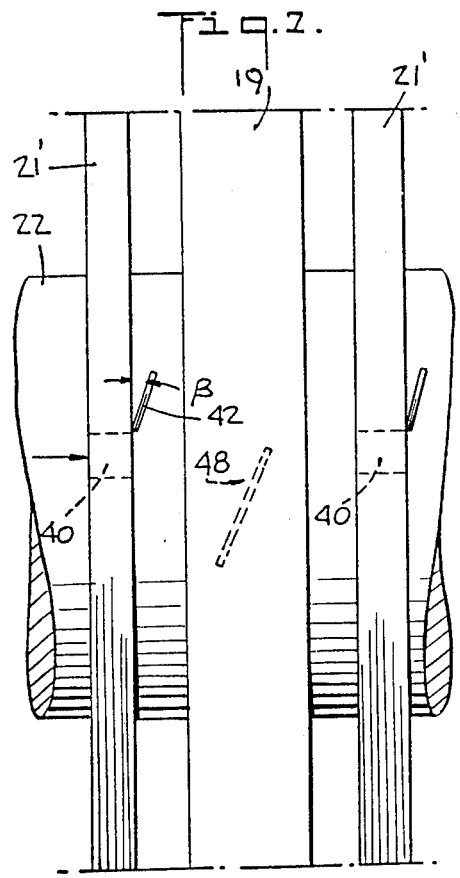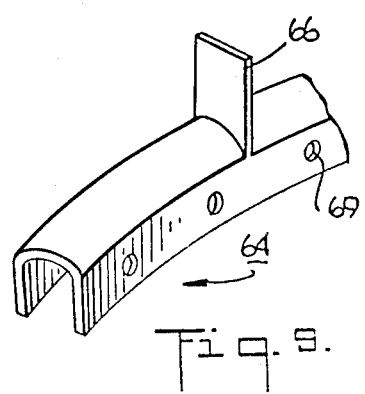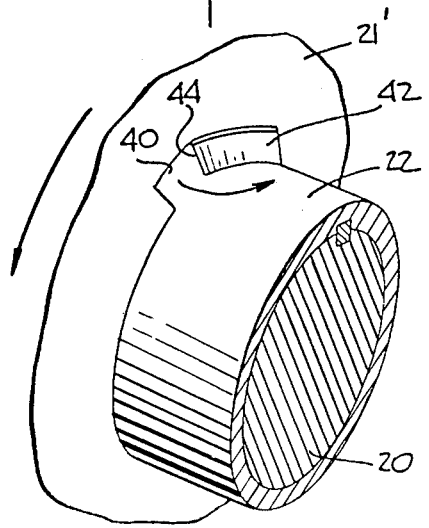

SOLIDS CONCENTRATOR WITH A ROTOR HAVING PLOUGHS THEREON

This is a division, of application Ser. No. 469,627, filed May 13, 1974, now U.S. Pat. No. 3,884,813.

BACKGROUND OF THE INVENTION

This invention relates to an apparatus for separating a filtrate and a concentrate of solids from a solids-containing fluid. More particularly, this invention relates to a dynamic concentrator having a rotor therein.

Various types of dynamic filtration devices have heretofore been known for concentrating the solids content of a fluid. For example, as described in U.S. Pat. No. 3,437,208, dynamic filters have been known with a number of stationary circular filtering members of hollow construction which are disposed between a number of rotating bodies which facilitate movement of a solids-containing fluid through and into the filtering member. During operation of such devices, a solids-containing fluid is pumped under pressure across the surfaces of filtering screens or diaphragms of the assembled filter members so that a portion of the fluid is passed through the diaphragms and into the supporting filter member structures. Such fluid is thereafter removed as a filtrate. At the same time, with a filtration device of the type described in U.S. Pat. No. 3,437,208, solids tending to remain on the filtering diaphragms during the filtering operation are continuously returned into the solids-containing fluid to increase the concentration of solids within the filtration device and thereby form a thickened slurry for subsequent removal from the device.

Provisions have also heretofore been made for cleaning the surfaces of filtering diaphragms to remove any accumulation of solids material thereon. In some instances, the filtration devices have been periodically dismantled in order to remove the filtering diaphragm for cleaning purposes. In other instances, a backwash arrangement has been used to wash solids from the filtering surfaces, for example by means of a flow of water from the interior of a hollow filter and into the device through the filtering diaphragms. In still other instances, vibrating plates have been used to produce a pressure wave for loosening solids accumulated on the filtering diaphragms, for example as described in U.S. Pat. No. 3,455,821.

Dynamic filters are also known in which filtering diaphragms are rotatable, such as in U.S. Pat. NO. 3,643,806. In these instances, scrapers have sometimes been positioned to extend across and be moved adjacent the surfaces of the filter diaphragms to scrape solids materials from the diaphragm surfaces and thereby clean the surfaces of the filter diaphragms.

In the case of a concentrator using stationary circular filters of hollow construction and rotor members therebetween, it has been found that there is a tendency for the centrifugal force generated in the solids-containing fluid by the rotor members to cause solids to collect in the concentrator in the regions radially outside of the rotor members, for example in the outer radial corners by adjacent filter members. It has also been found that there is a tendency due to a reduced rate of flow of the solids-containing fluid for solids to collect in the regions adjacent the hub or other means mounting the rotor member to the rotor shaft. It has been found that the tendency for accumulation of solids in the two mentioned regions occurs despite the use of scrapers for intermittently cleaning the surfaces of the filter screens or diaphragms. It has further been found that continued accumulations in these regions can impair the operation of the concentrator and also obstruct ready dismantling thereof, such as when it is desired to convert the concentrator to use with a different solids-containing fluid or hydraulically clean the unit between runs in order to obviate opening and mechanically cleaning the unit. Apart from any impairment of efficiency during operation of the concentrator, a requirement for periodic halting of operation to clean out accumulated solids also impairs the overall efficiency of the concentrator by increasing its down-time.

OBJECTS OF THE INVENTION

Accordingly, it is an object of this invention to provide means for deterring the tendency for solids material to accumulate on the inner surface of a concentrator casing between the filtering members of the concentrator.

It is a further object of this invention to provide means for deterring the tendency for solids material to accumulate in the region radially outside of a rotor within a concentrator.

It is a further object of this invention to provide means for deterring the tendency for solids material to accumulate adjacent the rotor shaft of a dynamic concentrator.

It is a further object of this invention to provide means for deterring any tendency for solids material to accumulate within a concentrator not only mechanically but also hydraulically, by using solids-containing material within the concentrator as a washing and abrading medium.

It is a further object of this invention to be able to thoroughly hydraulically wash the interior of the concentrator without the necessity of dismantling and cleaning the interior by hand.

SUMMARY OF THE INVENTION

Briefly, the invention provides a concentrator having stationary circular filter members of hollow construction and shaft-mounted rotor discs between adjacent filter members, with at least one plough on the outer periphery of each rotor disc extending radially outwardly of the disc and into the flow path of a solids-containing fluid passing across the disc's radial periphery. The plough is sized to extend into the annular volume or region generally defined by the circumferential periphery of a disc, two adjacent filter diaphragms or other surfaces on either side of the disc, and an inner surface of a casing of the concentrator. During rotation of the disc, the plough serves to create sufficient turbulence within the fluid flow path to mitigate or overcome any tendency for centrifugal force generated in the fluid by the disc to build up an accumulation of solids between the filter members in areas radially remote from the disc periphery, such as adjacent the outer wall of the concentrator or in the outer radial corners by adjacent filter members.

While the use of one plough on a given rotor disc can be useful, the disc may be slightly unbalanced with a single plough alone. Thus, two or more ploughs are accordingly located equally spaced around the periphery of the disc or a counterweight is used in cooperation with a single plough to avoid imbalance. The ploughs are of a flat plate-like shape and are secured to the outer periphery of the rotor disc as by welding or by riveting. The ploughs can alternatively be integral with the rotor disc or be secured within recesses in the periphery of the rotor disc rather than to its outer periphery.

Each plough can be disposed perpendicularly to the plane of the disc or be inclined at some angle other than a right angle to the plane thereof. Further, the longitudinal axis of a plough can extend straight out along the line of a radius of the rotor disc, or the plough members can be curved or bent or in general shaped along their lengths either forwardly in the direction of normal rotation of the disc or backwardly opposite to the direction of normal rotation. It is also within the contemplation of this invention that the direction and degree of inclination of the ploughs relative to the axis of rotation of the rotor disc can be varying; that is, a plough may be twisted along its length beyond the periphery of the disc. Additionally, it is contemplated that ploughs can be bent out of the plane of their supporting rotor disc either forwardly or backwardly in the flow path of the solids-containing fluid passing the outer edge of the disc. Further the ploughs do not have to be all the same configuration or size and can be varied in size, angle and configuration in both length and width.

The invention further provides a concentrator having stationary annular filter members of hollow construction with at least one plough on the inner edge of each filter member extending toward the rotor shaft of the concentrator. These ploughs serve to mitigate or overcome any tendency for solids to accumulate in the region between the inner edge of the annular filter members and the rotor shaft from which the inner edge is spaced.

The invention further provides a concentrator having shaft-mounted rotor discs or disc assemblies of solid or of hollow construction each of which includes a hub portion secured to a through-passing shaft, wherein at least one passage or opening for the flow of solids-containing fluid from one side of the disc to the other is provided in the rotor disc adjacent its hub and wherein a plough is provided on the hub and adjacent the passage to deter an accumulation of solids adjacent the passage.

BRIEF DESCRIPTION OF THE DRAWINGS

The nature and substance of the present invention as well as its objects and advantages will be more clearly perceived and fully understood from consideration of the following detailed description and appended claims taken in conjunction with the accompanying drawings in which:

FIG. 1 is a partial view in longitudinal cross-section of a concentrator having stationary filter members of hollow construction and interposed rotor discs with ploughs thereon according to the invention;

FIG. 2 is a side view of a rotor disc of the concentrator of FIG. 1 with a plurality of radially extending ploughs according to the invention;

FIG. 3 is a fragmentary view along the line 3—3 of FIG. 2 of a rotor disc having a radially extending plough which is disposed at an angle α other than a right angle to the plane of the disc;

FIG. 4 is a fragmentary side view of a rotor disc having a bent plough according to the invention;

FIG. 5 is a partial view in longitudinal cross-section of a concentrator having stationary filter members of hollow construction with ploughs on their inner edges, and having interposed rotor discs with ploughs both on the radial periphery of the discs and also adjacent the hubs of the discs;

FIG. 6 is a fragmentary perspective view of the hub portion of a rotor disc of the concentrator illustrated in FIG. 5;

FIG. 7 is a partial edge view of a filter member and a pair of adjacent rotor discs of the concentrator illustrated in FIG. 5;

FIG. 9 is a fragmentary perspective view of a binder ring for the rotating filter members of the concentrator of FIG. 8.

DESCRIPTION OF THE PREFERRED EMBODIMENTS

Figure 8:
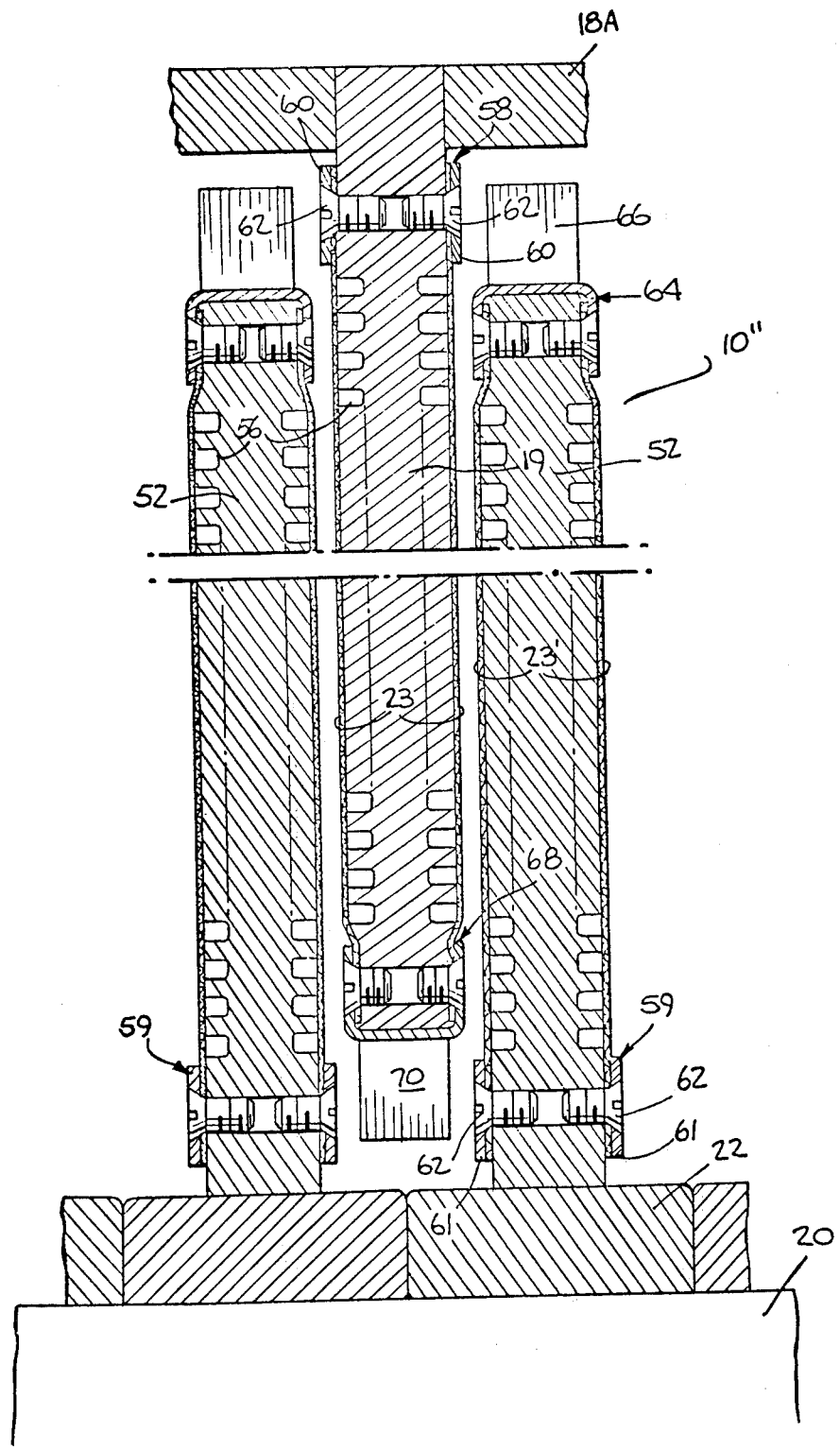
FIG. 8 is a fragmentary cross-sectional view of a concentrator according to the invention having an annular stationary filter member of hollow construction with ploughs thereon extending toward the rotor shaft, the stationary filter member being interposed between rotating filter members of hollow construction with ploughs on their outer peripheries.

Referring to FIG. 1, a concentrator 10 is constructed having the form of a housing 11 which defines a separation chamber 12 and includes a pair of end plates 13, 14 at the opposite ends. The front end plate 13 is provided with an inlet spigot 15 which may be coupled to a pump or fluid supply means 15A for the introduction into the concentrator of a solids-containing fluid, while the rear end plate 14 is provided with an outlet spigot 16 for the removal from the concentrator of a concentrated slurry. In addition, the outlet spigot 16 may have a control valve 16A to control the outflow of the slurry through the spigot. Housing 11 is actually of built-up or stacked construction and is held together by a plurality of tie rods 17 with a nut 17A on each end. These rods and nuts press together the end plates 13, 14 between which are a plurality of ring-like elements 18 constituting outer rims or flanges each on a separate annular filter element 19. Gross and aligning support for the compressed assembly may be provided by oppositely disposed ears or brackets on the outer peripheries of elements 18 resting on parallel rails not shown.

A rotor shaft 20 operatively coupled to a motor 20A passes through the front end plate 13 of the housing of the concentrator 10 and terminates at a point within the separation chamber 12 which is spaced from the housing's rear end plate 14. This shaft 20 carries a plurality of rotor discs 21 within the separation chamber 12 which turn with the rotor shaft. The rotor discs 21 are each in the form of a solid body in the embodiment of FIG. 1. Each disc is secured at an inner collar or hub 22 to the shaft 20 typically by a key, and has an outer, generally cylindrical periphery of a diameter less than the inside diameter of the respective concentric ring portion 18 as well as less than the outer diameter of the filter diaphragms 23 on the faces of the respective adjacent filter elements 19. In addition, the side surfaces of each rotor disc 21 are spaced longitudinally from the respective adjacent end wall 13, 14 of the concentrator or the face of each respective adjacent filter element 19. Thereby a continuous, convoluted flow path for the solids-containing fluid is provided from the inlet spigot 15 through the chamber 12 and to the outlet 16. That flow path extends across the filter surfaces 23 of the filter elements 19 from one side of each rotor disc to the opposite side thereof. It should be observed that the hubs 22 of disc 21 are in serially or sequentially abutting relationship, and serve to sapce out the discs 21 along shaft 20 at center-to-center intervals equal to those of adjacent filter elements 19.

Each filter element 19 is of annular configuration with an outer annular surface 24 which abuts an adjacent filter element 19, and with a central opening 25 for the passage of the rotor shaft 20. In addition, each filter element 19 is provided with filtering surfaces 23 formed for example by filter cloth on opposite sides, and each filter element is internally channelled and bored as shown in greater detail in FIG. 8 to provide a passageway 56 for communication of fluid passing through the filtering surfaces 23 with an outlet and a suitable fluid line (not shown) for the discharge of filtrate from the filter element. The filtering surfaces 23 are secured in place by means of circumerentially spaced bolts 28 which thread into the filter element on opposite sides thereof at a radius just short of the inner radius of concentric ring 18 and at opposite points near the central opening 25.

Each rotor disc 21 is provided with a plurality of ploughs 30, for example four, which are equally spaced about the periphery of the disc and at an angle α of, for example 75° to the plane of the rotor disc. In the embodiment of FIGS. 1 to 3, each plough 30 is of flat plate-like shape and is secured in a radial slot of a rotor disc 21 as by welding to extend radially from the disc while being disposed transversely to the plane thereof. Each plough 30 extends from a rotor disc 21 to a point near the inside surface of the ring portion 18 of a filter element 19, while also being spaced laterally from an adjacent filter element 19 or other surface such as end wall 13. For example, for a chamber 12 of a diameter of 24 inches measured as the inside diameter of the ring portion 18 of a filter element, and a filter diaphragm diameter of 21¾ inches, the ploughs 30 extend to within 1/16 inch from the inside of the ring portion 18. Each such plough 30 also extends laterally toward an adjacent filtering surface 23 to within about 1/16 inch of that surface.

During operation, as the rotor discs 21 are rotated there is a flow of solids-containing fluid in a sinuous pattern, entering at inlet spigot 15, from one side of each rotor disc to the other and across the filtering surfaces 23 of the filter elements 19 as indicated in FIG. 1, with the fluid making a tight U-turn about the outer periphery of each disc 21 and the inner peripheries of the filter elements. During such operation the movement of the ploughs 30 through the flow path of the solids-containing fluid prevents blockage at the outer U-turns due to an accumulation of solids. The movement of the ploughs also causes turbulence in the regions between the rings 18 in the nature of spacer rings and the outer periphery of each disc 21. This turbulence tends to mitigate or overcome any tendency of solids in the solids-containing fluid to accumulate under centrifugal force in the remote areas or corners of the chamber 12 outside the circumferential periphery of the rotor discs, such as adjacent the ring portions 18 or adjacent the filtering surfaces 23. The turbulence caused by the ploughs 30 has additional significance when the solids-containing fluid is thixotropic in nature. Further, the ploughs 30 cause the solids-containing fluid itself to act as a washing and abrading medium in the regions beyond the outer peripheries of the rotor discs.

Although four ploughs 30 are shown in FIG. 2, an increased number of ploughs may be utilized on each rotor disc. Such ploughs will be preferably equally spaced from one another to avoid an imbalance of the disc during operation. Of course, although as shown in FIG. 3 in this embodiment each plough 30 is disposed at an angle α other than a right angle to the plane of its rotor disc, the ploughs can also be disposed normal to the planes of their discs 21.

In the embodiment of FIG. 4 a rotor disc 21 is provided with ploughs 30 each having one end secured within a recess in the edge of disc 21 normal to the plane of the disc, and a free end or blade 31 which is bent forwardly in the indicated direction of normal rotation of the disc. These blade portions 31 can also be bent backwardly opposite to the normal direction of disc rotation and/or out of the plane of the disc forwardly or backwardly in the flow path of the solids-containing fluid passing the disc. Further, they may be twisted in their free extent beyond the disc.

In FIG. 5 a further embodiment of this invention is illustrated in which reference numbers corresponding to those used in FIG. 1 are used to denote like members. FIG. 5 illustrates a concentrator 10' having a housing 11 which defines a separation chamber 12. The front end plate 13 of the concentrator 10' has an inlet spigot 15 for the introduction of a solids-containing fluid into the concentrator. The housing 11 includes a plurality of annular filter elements 19 of hollow construction with a diaphragm or other filtering surface 23 secured to each of its faces by bolts 28. A rotor shaft 20 passes through the front end plate 13 of the concentrator and carries a plurality of rotor discs 21' of solid construction.

Each rotor disc 21' is provided with a plurality of ploughs 30, for example four, which are equally spaced about the periphery of the disc. As shown in FIG. 6 each rotor disc 21' also has at least one passage 40 in its base extending from one side of the disc to the other, adjacent to the inner collar or hub 22 at which the disc is secured to the rotor shaft 20. The plurality of passages, for example two, are so provided equally spaced about the base of the disc to provide a path of communication for some relatively small amount of solids-containing fluid directly from one side of the disc to the other. Referring to FIGS. 6 and 7, a plough 42 inclined to the longitudinal axis of hub 22 and hence to that of the rotor shaft 20 is provided on the down-stream side of each passage 40. The plough 42 is inclined at a slight angle β of for example 15° to the plane of rotor disc 21', with one edge 44 of the plough being adjacent a side of the passage 40. Each plough 42 is secured as by welding to its respective hub 22 and, as shown in FIG. 6, the upstanding edge 44 of the plough adjacent the passage 40 is closely adjacent and preferably secured as by welding or riveting thereto so that no gap exists between edge 44 and the wall of the passage 40, i.e., no gap between side or edge 44 and disc 21'.

Referring to FIGS. 5 and 7, in the illustrated embodiment of this invention ploughs 48 extending toward the hubs 22 of rotating discs 21' and hence effectively toward rotor shaft 20 are provided on the inside of each of the stationary filter members 19. These ploughs 48 are secured as by welding or riveting to the inner periphery of each of the filter members. As the ploughs 48 are stationary there would be no imbalance with the use of a single plough 48 rather than a plurality of equally-spaced ploughs 48 on the periphery of the filter member. The ploughs 48 can be mounted parallel to the axis of shaft 20 or else at some angle to that axis, for example at such angle that they are essentially parallel to ploughs 42 if those ploughs be present as shown in FIG. 7. A plurality of ploughs can be employed if desired about the inner periphery of the filter disc to cooperate with the rotating hubs 22 to deter any accumulation of solids on the surfaces of the hubs in the region between the edge of the stationary filter and the adjacent hub surface.

In operation of the embodiment of this invention illustrated in FIGS. 5 to 7, a portion of a solids-containing fluid entering the concentrator 10' through inlet spigot 15 follows a sinuous flow path in the separation chamber 12 out along one side of a rotor disc 21', with a U-turn in the region swept by the ploughs 30 at the periphery of that rotor disc; then in along a filtering surface 23 of a filtering element 19, with another U-turn in the region of the ploughs 48 at the inner periphery of that filter element, and then out along the other side of the same filtering element 19. At the same time a portion of the solids-containing fluid entering the concentrator 10' through the inlet spigot 15 flows toward the rotor shaft 20 and along the hubs 22 of the rotating discs 21' through the passages 40 at the bases of the rotor discs 21'. Another portion of the solids-containing fluid will at times follow the mentioned sinuous path about the outer peripheries of the rotor discs 21', and at other times will follow the mentioned path through the passages 40 at the bases of the rotor discs 21'. The bulk of the fluid flows sinuously.

The rotating ploughs 30 on the outer peripheries of the rotor discs 21' serve to deter or eliminate any tendency of solids to accumulate in the regions bounded by the outer peripheries of the rotor discs, the opposing inner surfaces of the ring portions 18 of the stationary filter members 19, and the adjacent portions of the filtering surfaces 23 or walls, as for example wall 13 of the concentrator 10'. The stationary ploughs 48 have free ends which extend adjacent the rotating disc collars or hubs 22 carried by the rotor shaft 20, and serve to deter or prevent an accumulation of solids in the region bounded by the surface of the adjacent collar and the inner peripheries of the respective filter member 19 on which they, the stationary ploughs, are mounted. Each of the ploughs 42 carried by the rotating hubs 22 on the downstream sides of the passages 40 serves to provide a forward thrust to solids-containing fluid on its supporting collar or hub 22 as that fluid leaves its adjacent passage 40. In addition, the ploughs 42 impart centrifugal force to the slurry coming down the side of the filtering surface 23. The ploughs 42 aid in preventing blockage of the flow path due to an accumulation of solids; cause a turbulence which has additional significance when the solids-containing fluid is thixotropic in nature, and by causing movement in the fluid also serve to cause the fluid itself to act as a washing and abrading medium to deter blockage adjacent the inner peripheries of the stationary filters 19.

FIG. 8 illustrates a further embodiment of this invention in which reference numbers corresponding to those used with regard to the embodiment of FIG. 1 are used to denote like members. In this concentrator a plurality of stationary filter members 19 alternate within the concentrator 10'' with rotatable filter members 52 of hollow construction. The rotatable filter members 52 are mounted on a rotor shaft 20 by means of inner hubs or collars 22 which may be integral with the filter members, or to which the filter members may be secured as by welding.

Each of the filter members 19, 52 illustrated in FIG. 8 has a diaphragm or other filtering surface 23, 23' respectively on each face, and interior channels 56 for communicating filtrate flowing through the filtering surface with a suitable filtrate discharge means which communicates with the exterior of the concentrator 10''. Further, the filter members 19, 52 have clamping means 58, 59 respectively at their base ends for securing their respective filter diaphragms 23, 23' in place. Each clamping means 58, 59 comprises a flat, circular member or ring 60, 61 respectively on either side of the filter member which has circumferentially spaced bolt holes aligned with holes in the filtering surfaces 23, 23' and with threaded holes in the respective filter member. It further comprises a plurality of bolts 62 threaded into the bolt holes from each side of the concerned filter member to secure the clamping rings 60, 61 in place overlying the edges of the filtering surfaces 23, 23'.

Each of the rotating filter members 52 is further provided with a clamping ring or rim 64 along its outer periphery which differs from the clamping rings 61 on its base in that the clamping ring 64 on the periphery of each filter member 52 is generally channel-shaped in outwardly convex cross-section to overlie the outer periphery of the filter member 52 as shown in FIG. 9, and also in that each clamping ring 64 has a plurality of ploughs 66 equally spaced and secured as by welding about its outer surface. This binding or clamping ring is preferably comprised of a plurality of separate members rather than being a single closed loop to facilitate the mounting of each such ring upon the peripheral edge of a filter member 52. For example, three ring segments each having a 120° arc length can be used, or four segments each having a 90° arc length, or as few as two segments each of 180° arc length.

Each of the stationary filter members 19 is provided with a generally channel-shaped binding ring 68 which, besides being much shorter and convex inwardly, differs from the binding rings 64 on the rotating filter members 52 in that the ploughs 70 on binding rings 68 extend to the interior rather than to the exterior of the closed loop formed by each assembled ring 68.

The clamping rings 68 are formed of a plurality of separate arc segments to facilitate their assembly in place upon the filter members. For example, the clamping rings 68 may be formed of three members each with a 120° arc length or of four members each with a 90° arc length. Both channel-shaped clamping means 64 and 68 have circumferentially spaced bolt holes 69 along their lateral peripheries for the reception of bolts which are passed through aligned holes in the underlying filter diaphragms 23', 23 and threaded into matched holes in the respective filter members. The clamping means thereby overlie the outer and inner edges of the filter diaphragm 23', 23 respectively and hold the diaphragms in place on the respective filter members 52, 19. The ploughs 66, 70 may be positioned normal or inclined to the radial planes of their respective clamping rings 64, 68. Also, each may be straight along its length or have a bent free end similar to that described with reference to the ploughs illustrated in FIG. 4 hereof. In keeping with other embodiments of this invention described herein, the ploughs 66, 70 on the filter members tend to deter the accumulation of solids in adjacent fluid paths and regions, as well as to cause the fluid itself to act as a washing medium.

Referring to FIG. 8, the stationary filter member 19 can be joined as by welding to an adjacent spacer ring 18A. Alternately, the filter element 19 can be an integral portion of a spacer ring such as is illustrated in the embodiments of FIGS. 1 and 5. Similarly, the embodiments of FIGS. 1 and 5 can be constructed with separately fabricated spacer rings and associated filter elements 19.

Conclusion

As appears from the foregoing, by this invention a component force can be created in the flow path or paths of solids-containing fluid in a concentrator which will tend to deter the accumulation of solids where such accumulation may block any particular flow path, and to cause such solids to return into the main flow path. In one capability or operational attribute, the ploughs act as scrapers to dig out any accumulated solids material. In another capability the ploughs act as turbulators to create turbulence in the flow of material to prevent settling out of solids. In still another capability the ploughs serve to cause the solids-containing fluid itself to act as a washing medium which tends to keep surfaces within the concentrator clean by its continual movement across or against such surfaces. A washing effect is also available when the concentrator is operated with an essentially solids-free fluid flowing through it, that fluid being employed as an intermediate cleaning agent when it is desired that the concentrator be switched from processing a given solids-containing fluid to processing another such fluid. In this way the concentrator may be washed or cleaned or freshly conditioned without being disassembled. Since the apparatus of this invention provides means both for concentration of solids into a thickened slurry and also for the obtaining of a filtrate, the terms "concentrator" and "filter" are each used generically herein with reference to the invention such that each includes filtration apparatus wherein a useable filtrate is desired as an output, as well as concentrators wherein a useable concentrate is desired as an output.

While in the described embodiments of this invention the filter surfaces 23 and the housing for the concentrator are described as being stationary, it is within the contemplation of this invention that all filter surfaces, the housing or both all filter surfaces and the housing can rotate or be otherwise non-stationary, so long as the concentrator includes a rotor element which rotates relative to the filter surfaces 23 and the housing. More generally, it is contemplated that there be at least two spaced-apart surfaces which are stationary relative to each other, and a rotor element which extends between and is in movement with respect to the relatively stationary surfaces. In this regard it is further contemplated that the housing of the concentrator and the relatively stationary surfaces may rotate either in the same or the counter direction as the direction of rotation of the rotor element.

Also, while relatively stationary filter surfaces are described herein which cooperate with a rotor disc of solid construction, it is contemplated that relatively stationary discs of solid construction can be employed in association with filter members carried by a rotor shaft. Further, it is contemplated that a concentrator according to this invention can comprise an alternating or serial arrangement of rotor elements which are sometimes of hollow construction to serve as filter elements and sometimes of solid construction, together with relatively stationary members which are sometimes of solid construction and sometimes of hollow construction to serve as filter elements. In all such arrangement it is contemplated that ploughs be employed such as described in the foregoing. Protection by Letters Patent of this invention in all its aspects as the same are set forth in the appended claims is sought to the broadest extent that the prior art allows.

We claim as our invention:

1. A dynamic concentrator for separating a filtrate and a concentrated slurry from a solids-containing fluid, said concentrator comprising (1) a housing characterized by a longitudinal axis and having an inlet for introducing a solids-containing fluid into said housing and an outlet for removing a concentrated slurry of solids therefrom; (2) at least two substantially parallel, coaxially spaced-apart and relatively stationary filter means mounted within said housing between said inlet and said outlet, said filter means each being of annular configuration and each comprising a filter chamber having at least one filtering surface with the interior of each filter chamber being in fluid communication with the exterior of said housing for the removal of filtrate from those chambers; (3) a rotor shaft disposed to have motor means connected thereto for imposing rotation thereon extending coaxially through said housing and the central openings of said annularly configured filter means with perceptible radial clearance from the inner peripheries of said two filter means; (4) a radially extensive element mounted on said shaft to be turned therewith between said two filter means in spaced relation to each of them and having at least one passageway therethrough in juxtaposition to said rotor shaft to permit a minor flow of the solids-containing fluid through said radially extensive element; and (5) at least one plough member mounted to said rotor shaft in juxtaposition to the passageway through said radially extensive element and disposed to rotate with said element and said rotor shaft.

2. A dynamic concentrator as set forth in claim 1 wherein said plough member is adjacent the downstream side of said passageway and is configured to provide forward thrust on solids-containing fluid issuing through said passageway.

* * * * *